United States Patent [19]

Klauck et al.

[11] Patent Number: 5,516,850
[45] Date of Patent: *May 14, 1996

[54] IONIC POLYMERS

[75] Inventors: Wolfgang Klauck, Meerbusch; Ernst-Ulrich Rust, Bergisch-Gladbach; Peter Daute, Essen; Johann Klein, Duesseldorf; Ludger Willeke, Oberhausen, all of Germany

[73] Assignee: Henkel Kommanditgesellschaft auf Aktien, Duesseldorf, Germany

[21] Appl. No.: 315,655

[22] Filed: Sep. 30, 1994

Related U.S. Application Data

[63] Continuation-in-part of PCT/EP94/00727, Mar. 25, 1993.

[51] Int. Cl.$^6$ .............................. C08F 20/62; C08F 8/42; B32B 27/36
[52] U.S. Cl. .................... 525/329.5; 525/366; 525/370; 428/480
[58] Field of Search ................... 525/329.5, 366, 525/370; 428/480

[56] References Cited

U.S. PATENT DOCUMENTS

| | | | |
|---|---|---|---|
| 2,614,998 | 10/1952 | Lea | 260/29.6 |
| 4,321,337 | 3/1982 | Smith | 525/329.5 |

FOREIGN PATENT DOCUMENTS

| | | |
|---|---|---|
| 0197662 | 10/1986 | European Pat. Off. . |
| 0342276 | 11/1989 | European Pat. Off. . |
| 0454224 | 10/1991 | European Pat. Off. . |
| 1490970 | 7/1967 | France . |
| 1273100 | 7/1968 | Germany . |
| 2337606 | 4/1974 | Germany . |
| 3800984 | 7/1989 | Germany . |
| 1155209 | 6/1969 | United Kingdom . |

OTHER PUBLICATIONS

H. Matsuda, Journal of Polymer Science, Polymer Chemistry Edition 12, 455–468 (174).
H. Kothandaraman, Polymer Bulletin 13, 353–356 (1985).

*Primary Examiner*—Joseph L. Schofer
*Assistant Examiner*—Wu C. Cheng
*Attorney, Agent, or Firm*—Wayne C. Jaeschke; John Daniel Wood; Daniel S. Ortiz

[57] ABSTRACT

The invention relates to ionic polymers obtained by reaction of carboxyfunctional fat- and oil-based starting materials with salts of polyvalent ions. They may be used as sealants, coatings, adhesives and as additives for plastic formulations and for mortars, gypsums and cements. The starting mixture may be present both in a one-component formulation and in a two-component formulation.

15 Claims, No Drawings

IONIC POLYMERS

CROSS-REFERENCED TO RELATED APPLICATION

This application is a continuation-in-part of PCT/EP93/00727 filed Mar. 25, 1994.

FIELD OF THE INVENTION

This invention relates to ionic polymers obtainable from polyvalent ions and polybasic carboxylic acids and to their production and use.

BACKGROUND OF THE INVENTION

Ionic polymers are polymers containing ionic groups as parts of the main chain or laterally thereof. Depending on the ion content, they may be divided into polyelectrolytes and ionomers. Polyelectrolytes have a high percentage ion content and are generally soluble in water, examples being polymethacrylic acid or polyacrylic acid. By contrast, ionomers are generally insoluble in water on account of their largely apolar main chain and their relatively small content of ionic groups. Known ionomers are polyacrylates, polyurethanes and, in particular, thermoplastic copolymers of ethylene with carboxyfunctional monomers, particularly methacrylic acid, which are partly present as salts of sodium, potassium, magnesium or zinc. By virtue of the ionic bond, they are thermo-reversibly crosslinked. They are used, for example, as films for packaging and coating materials and inter alia as self-adhesive films.

It is also known to the expert that carboxyl-group-stabilized dispersions (anionic dispersions) can readily coagulate in contact with polyvalent dissolved cations (for example $Ca^{2+}$, $Zn^{2+}$, $Al^{3+}$, etc.) because insoluble carboxylate salts eliminate the emulsifier effect. This principle is used to improve dispersions containing carboxyl groups in the water resistance and non-tackiness of the films by complexed Zn or Zr ions after drying and evaporation of the ligand (see, for example, EP 0 197 662, DE 23 37 606, DE 38 00 984). Accordingly, ion-compatible dispersions are generally cationically or nonionically stabilized.

In addition, it is known from works of Matsuda and Kothandaraman (see, for example, H. Matsuda, Journal of Polymer Science 12, 455–468 (1974); H. Kothandaraman, Polymer Bulletin 13, 353–356 (1985)) that special short-chain OH-terminated compounds containing a carboxyl group prepared in solvents change their properties, for example their melting point, by dimerization with divalent salts. After dissolution in organic solvents, these solids bridged by polyvalent ions can be reacted with aromatic or aliphatic diisocyanates to form glass-like polymers.

However, there is no document in the prior art which describes oligomers processable in particular at room temperature to give useful performance properties simply by linking individual fat- and oil-based oligomer structural units by salt bridges of polyvalent ions.

Hitherto, the need for ecologically safer products in such fields as sealants, coatings (for example lacquers and paints), adhesives, plastics processing and fire prevention, which has arisen out of the increase in environmental awareness, has only been partly satisfied. Both organic solvents and residual monomers or chlorine-containing polymers have to be replaced by alternative systems. Thus, polymers dissolved in organic solvents have been increasingly replaced, for example, by aqueous polymer dispersions in the past few decades. Products such as these cure or set through evaporation of the liquid phase which can or does give rise to a considerable shrinkage in volume and, in the case of water-based systems, to a marked dependence of the drying time on climatic conditions.

In addition to systems which already contain preformed polymers to establish the final properties, there are also reactive systems based on monomers or oligomers which cure by chemical reaction of 1 or 2 components. Cyanoacrylates, NCO-terminated polyurethanes, which set or crosslink under the effect of moisture, or 2-component epoxides and polyurethanes are well known to the expert. Like 1-component reactive systems, 2-component product formulations consisting of resin and catalyst often contain highly reactive, toxicologically unsafe monomers or residual monomers or form unwanted decomposition products in use—a fact which generally has to be communicated to the consumer by warnings (on labels).

Advantages of reactive systems include, for example, their relatively low starting viscosity (the high molecular weight polymers are only formed during the curing process) and the possibility of obtaining 100% systems with no significant shrinkage in volume. It would be extremely desirable to utilize the advantages of known 1- and 2-component reactive systems, but at the same time to be able to resort to toxicologically safer and environmentally more compatible starting monomers or oligomers.

SUMMARY OF THE INVENTION

It has now surprisingly been found that toxicologically substantially safe carboxylic acids which are liquid or can still be spread at the application temperature, more particularly room temperature, cure under the effect of polyvalent ions and, optionally, moisture to give high-performance polymer structures ("ionic curing"). Materials of corresponding structure which are highly viscous or solid or cannot be spread at room temperature may be internally hardened on the same principle, as known for example from hotmelt adhesives post-curing through isocyanate crosslinking.

Accordingly, the present invention relates to ionic polymers obtainable from carboxylic acids, or reactive derivatives thereof, and polyvalent metal ions, the carboxylic acids in turn being obtainable by chemical modification of fats and oils and having a molecular weight of at least 200 for at least 70% by weight of said carboxylic acids. The fats or oils or derivatives produced from them may be of both vegetable and animal origin or, optionally, may be selectively synthesized by petrochemical methods.

DETAILED DESCRIPTION OF THE INVENTION

Suitable carboxylic acids are representatives of all oil- and fat-based raw materials which, on average, contain at least one and preferably 1 to 10, more preferably 2 to 5 carboxylic acid groups per oligomer molecule or which can release these carboxylic acid groups by reaction with water. They may be obtained, for example, by ene reactions, transesterifications, condensation reactions, grafting (for example with maleic anhydride or acrylic acid, etc.) and, for example, epoxidations with subsequent ring opening. Basic oleochemical reactions such as these may preferably be carried out on fats and oils containing double bonds and/or OH groups, for example on fats and oils from rape (new), sunflowers, soybeans, linseed, coconuts, oil palms, oil palm kernels and olive trees. Preferred fats and oils are, for example, beef tallow with a chain distribution of 67% oleic acid, 2% stearic acid, 1% heptadecanoic acid, 10% saturated $C_{12-16}$ acids, 12% linoleic acid and 2% saturated>$C_{18}$ acids or, for example, the oil of new sunflowers (NSf) which consists of approx. 80% oleic acid, 5% stearic acid, 8% linoleic acid and approx. 7% palmitic acid.

Ene reactions are carried out, for example, with anhydrides on unsaturated fats and oils at elevated temperature. Epoxidations of double bonds and subsequent ring opening, for example with amines, aminoalcohols, alcohols, diols, polyols, hydroxycarboxylic acids or polycarboxylic acids, provide access, for example, to the fat- and oil-based starting materials required containing acid or anhydride groups. The fatty acids used for these reactions may also be hydrolysis products of the fats and oils containing unsaturated groups or OH functions. Other reactions such as, for example, simultaneous or subsequent condensation or transesterification reactions can lead to a further increase in the molecular weight of the COOH-terminated fat- and oil-based structural elements. The degree of oligomerization or the molecular weight and nature of the starting materials should be selected according to aspects generally known to the expert so that the resulting oligomer can be spread or processed at the corresponding processing temperature (for example even room temperature).

Suitable polyvalent metal ions—preferably in the oxidation state +2 to +4 —are any of the ions which form poorly soluble complexes with carboxyl groups, as known for example from metal soaps. Preferred cations are Ca, Be, Mg, Al, Zn, Sr, Cd, Ba, Hg, Sn, Zr, Pb, Ti, V, Cr, Co, Mn, Cu, Bi, Fe and Ni. Of these, Mg, Ca, Al, Sn and Zr are particularly suitable. The monovalent metal ions Li, Na, K, Cu, Rb, Ag, Cs—preferably Li, Na, K—may also be used in stoichiometric quantities of up to 65% and preferably 30%, based on the total content of cations. In principle, suitable counterions are any organic and inorganic anions such as, for example, halogens, more particularly F and Cl, nitrides, nitrates, sulfites, carbonates, hydrogen carbonates, chlorates, perchlorates, hydroxides, oxides, formates, acetates and propionates and hydrates thereof. Preferred embodiments contain hydroxides, hydrated oxides, oxides and/or carbonates, more particularly aquoxides. Aquoxides are understood to be any compounds of polyvalent metals which can be experimentally or formally derived from oxide and water, i.e. hydroxides, hydrated oxides or oxide aquates.

Up to 90% by weight, preferably up to 40% by weight and, more preferably, up to 20% by weight of salt is added.

The new formulations according to the invention consist of a fine-particle suspension of salts of polyvalent metal ions and, optionally, additives or salts showing a slightly alkaline reaction in a carboxyfunctional oligomer. The salts required may be present in free form or may be adsorbed, for example, on surfaces (for example aluminium oxide, silica gel or clays), dissolved or microencapsulated, for example to improve particle fineness or to enable the reaction to be retarded to a certain extent.

In addition, commercially available mortars, gypsums and cements containing Ca, Mg, Al or Fe ions are also suitable as potential cation donors. In this case, the claimed ionic polymers are produced by application of the carboxylic acids or anhydrides to a substrate already containing the polyvalent metal ions. In this case, both curing mechanisms (setting of the mortars, gypsums and cements and crosslinking of the carboxylic acids) may come into play at the same time so that the final properties of the formulations can be tailored over a very wide range by varying the concentrations of the individual components.

The carboxyfunctional fat- and oil-based formulations produced in accordance with the invention can be cured not only with up to a few percent of the salt-containing mortars, gypsums, cements, etc., but also vice versa: the inorganic materials may be modified (for example hydrophobicized or elasticized) by addition of a few percent of oligomers liquid at room temperature.

The reaction between the metal salts and the COOH-terminated oleochemical raw materials may be catalyzed by the same catalysts which are used, for example, in the production of soaps. In addition to the amines preferably used, OH-functional raw materials such as, for example, glycerol, polyols, sorbitol, sugars are also suitable. In addition, OH groups fixed to the oleochemical raw materials also catalyze the reaction.

The components "carboxylic acid" and "metal ions" may be present both separately (two-component formulation) and also in combination (one-component formulation). In the two-component formulation, the polyvalent salts should either be applied to the substrate beforehand from aqueous solution (primer), already present in the substrate (for example mineral substrates) or stirred in. The salts should be finely suspended. Relatively high particle fineness increases the curing rate. If the salt-like compounds and the fat- and oil-based carboxyfunctional starting materials are present in combination (one-component formulation), setting may be initiated either by increasing the temperature or by exposure to moisture. Moisture-curing systems are based, for example, on structures which only develop the carboxyl groups after a preliminary reaction with water (for example anhydride-containing fat- and oil-based raw materials).

Difunctional COOH-terminated oligomer structural units lead ideally to linear structures, particularly with divalent ions; trifunctional (or even more than trifunctional) COOH-terminated oligomer structural units lead to crosslinked structures in the same way as difunctional structural units with trivalent ions while monovalent ions act as chain terminators. The composition of the oligomer molecules in regard to their polyfunctionality is selected so that the optimal properties are achieved for the application envisaged. Highly elastic films should preferably be based on linear structures. High-strength compositions may contain crosslinking units, as also known to the expert. To improve the mechanical properties of the ionically bridged structural units, the molecular weight of the carboxylic acid should be greater than 200 and preferably greater than 400 while the degree of conversion of the oleochemical raw materials should not be too high, i.e. should be less than 1:2 and preferably less than 1:1.5, expressed as equivalents of COOH to the valency of the metal. The molecular weight of the carboxylic acid can be measured by means which include ebulliometry, cryoscopy, and membrane osmometry. Each of the measurements will yield a number average molecular weight as opposed to a weight average molecular weight. Because the carboxylic acids will typically have a low polydispersity, the weight average molecular weight will typically be essentially the same as the number average molecular weight.

Short-chain polybasic acids having molecular weights below 200 such as, for example, oxalic acid, adipic acid, maleic acid, phthalic acid, sebacic acid, malonic acid, succinic acid, glutaric acid, manic acid, tartaric acid, citric acid or their anhydrides may also be used in quantities of less than 30% and preferably less than 10%.

Plastic formulations containing a few percent (less than 40%) of the described ionically bridged polymers for modification or formulations containing a few percent (less than 40%) of other plastics, for example copolymers of ethylene and vinyl acetate, polyamide, polyester, polyurethane, polyacrylate, etc., are also possible.

The acids based on oleochemical structural units which are linked in particular by polyvalent ions may also be further processed to dispersions using internal emulsifiers, for example neutralized unreacted COOH groups, and/or external emulsifiers of nonionic and anionic character. External emulsifiers may be both low molecular weight compounds and also polymers. Emulsifiers or surfactants such as these are known to the expert and are described in numerous reference books (see, for example, Tensid-Taschenbuch, Dr. Helmut Stache, 2nd Edition, 1981, Carl Hanser-Verlag, München/Wien, more particularly pages 771 to 978).

In addition, anionic or nonionic stabilized polymer dispersions (for example acrylates or polyurethanes) may also be added as emulsifiers, the emulsifying effect being known to increase with increasing hydrophilicity. Protective colloids (for example starch, starch derivatives, cellulose derivatives, polyvinyl alcohols, etc.) as used in the production of polymer dispersions (for example polyvinyl acetate+ copolymers) may also be added. In formulations, the dispersions thus prepared containing ionically bridged acids may also be mixed with commercially available dispersions, anionically and nonionically stabilized dispersions having the best stability.

The polymer structures according to the invention are also distinguished by a flameproofing effect. The elimination of $CO_2$ catalyzed by the metal salts or the elimination of water with increasing temperature may be responsible for this effect.

The invention is illustrated by the following Examples.

Examples

A) Rigid compound

Example 1

1 Mol Dt-Dö 1447 (reaction product of fully epoxidized soybean oil with dimer fatty acid in a ratio of 1:1, based on 1 mol dimer fatty acid per epoxide group) is reacted with 1 mol $Ca(OH)_2$ at 30° C. A rigid elastic compound is obtained after 48 hours.

Example 2

1 Mol Dt-Dö 1448 (reaction product of fully epoxidized soybean oil with dimer fatty acid, 0.8 mol dimer fatty acid per epoxide group) is reacted with 1.5 mol MgO at 25° C. A rigid compound is obtained after 24 hours.

Example 3

1 Mol Dt-Dö 1498 (reaction product of fully epoxidized linseed oil epoxide with dimer fatty acid, 1.5 mol dimer fatty acid per epoxide group) is mixed with 1 mol MgO and 0.2 mol glycerol at 25° C. A solid but elastic compound is obtained after 1 hour.

B) Tacky compound

Example 4

1 Mol Dt-Dö 1447 is reacted with 0.65 mol MgO for 20 minutes at 80° C. A non-flowing tacky mass is obtained after cooling.

C) Elastic compound (Polyionizates with polymer additions to improve the mechanical properties)

Example 5

After reaction with 1.5 parts by weight MgO, 80 parts by weight Dt-Dö 1448 are reacted with 20 parts by weight Luviskol K 30 (polyvinyl pyrrolidone, a product of BASF) at 140° C. An elastic, tacky compound is obtained after cooling.

Example 6

After reaction with 2.5 parts by weight MgO and 1 part by weight ZnO, 60 parts by weight Dt-Dö 1347 (reaction product of 2 mol stearic acid methyl ester epoxide with 1 mol ethylene glycol and subsequent ester hydrolysis to the glycol-bonded dicarboxylic acid) are reacted with 40 parts by weight Escorene UL-05540 (ethylene/vinyl acetate copolymer) at 150° C. An elastic transparent compound—which is also suitable as a hotmelt adhesive—is formed after cooling.

D) Plastic compound (kneading compound)

Example 7

24.8 Parts by weight Dt-Dö 1347 are reacted with I part by weight MgO at 30° C. and 74.5 parts by weight chalk (Wical, a product of Grünsiegel) are incorporated in a kneader. The compound formed can be kneaded and molded by hand and is suitable as a permanently plastic sealant.

E) Moisture-curing systems

Example 8

90 Parts by weight Stru-DH 4844 (reaction product of maleic anhydride/sunflower oil (3:1) stirred under nitrogen for 6 hours at 210° C.) and 10 parts by weight MgO are mixed.

The mixture obtained, which is stable in storage for at least 3 months, is applied to a substrate (glass plate) in the form of a film (layer thickness 0.2 mm) and cures complete in 24 to 48 hours. This coating compound is also suitable for moist substrates where curing can take place more quickly.

Example 9

2% Water is added to the mixture of Example 8. After homogenization, exothermic curing takes place in a few minutes. Films of the cured material are no different from those of Example 8.

F) Dispersions

Example 10 (Comparison Example with Example 11)

Dt-Dö 1447 was stirred into cold $H_2O$ and 60% neutralized with NaOH. A fine-particle, extremely tacky dispersion (solids content 35%) with high adhesive transfer is obtained and cannot be used as a contact adhesive (tensile shear strengths on beechwood 0.03 $N/mm^2$, 10 $cm^2$ overlap). In other words, large quantities of adhesive remain on the two surfaces when the bond is broken.

Example 11

Dt-Dö 1447 was 65% bridged with MgO, based on the carboxyl groups, and stirred at 100° C. into water heated to 90° C. which contains the corresponding quantity of NaOH required to neutralize the remaining 35% carboxyl groups. A white dispersion (solids content 40%) with tensile shear strengths on wood of 3 $N/mm^2$ was formed.

Example 12

The reaction with MgO was carried out as in Example 11 and, at the same time, 20 parts by weight balsam resin were added to the melt at 100° C. During dispersion, the NaOH content was increased so that the carboxyl groups of the balsam resin were also neutralized. A homogeneous dispersion with tensile shear strengths on wood of 5.0 $N/mm^2$ was obtained.

Example 13

A dispersion was prepared as in Example 11, the water containing 30%, based on the solids content of the ionically bonded melt component, of the fine-particle polyurethane dispersion Pritt Alleskleber (a product of Henkel KGaA, anionic PUR dispersion based on isophorone diisocyanate, polytetrahydrofuran and dimethylol propionic acid, neutralized with NaOH, solids content 35%) before dispersion. The dispersion obtained had a solids content of 38% and tensile shear strengths on wood of 4 $N/mm^2$.

Measurement Of tensile shear strength

Tensile shear strength was measured on test specimens measuring 10×5×0.5 $cm^3$ at a crosshead speed of 10 cm/min. The test specimens were stored for 3 days at room temperature after bonding. The overlap of the test specimens was 2 cm×5 cm (bonded surface). This test was developed in accordance with DIN 53254.

What is claimed is:

1. Ionic polymer produced by the reaction of polyvalent metal ions with a member selected from the group consisting of an oligomer containing fatty acid residues and at least one reactable carboxyl group per oligomer molecule having a molecular weight above 200 and a mixture of said oligomer with up to 30% by weight, of said mixtures of a carboxylic acid having a molecular weight not higher than 200, to form salt bridges, said fatty acid residues of said oligomers being based on fats and oils.

2. The ionic polymers as claimed in claim 1 wherein said oligomers contain 1 to 10 carboxyl groups per oligomer molecule.

3. The ionic polymers as claimed in claim 1 wherein said oligomers contain 2 to 5 carboxyl groups per oligomer molecule.

4. The ionic polymers as claimed in claim 1 wherein said oligomer has a molecular weight of greater than 400.

5. The ionic polymers as claimed in claim 1 wherein said polyvalent metal ions are selected from the group consisting of Ca, Mg, Zn, Zr, Fe, Al and Ti and are derived from compounds wherein the counterions of said polyvalent metal ions are selected from the group consisting of oxide, hydroxide, carbonate and hydrogen carbonate.

6. The ionic polymers as claimed in claim 1 wherein said ionic polymer is produced by reaction of a mixture of a polyvalent metal compound and said member, said polyvalent metal compound comprising up to 90% by weight of said mixture of said polyvalent metal compound and said member.

7. The ionic polymers as claimed in claim 1 wherein said ionic polymer is produced by reaction of a mixture of a polyvalent metal compound and said member, said polyvalent metal compound comprising up to 40% by weight of said mixture of said polyvalent metal compound and said member.

8. The ionic polymers as claimed in claim 1 wherein said ionic polymer is produced by reaction of a mixture of a polyvalent metal compound and said member, said polyvalent metal compound comprising up to 20% by weight of said mixture of said polyvalent metal compound and said member.

9. A one-component, moisture-curable mixture useful for the production of an ionic polymer comprising an anhydride of a metal salt of a polyvalent metal ion and carboxylic acids and an anhydride of a carboxylic acid, said carboxylic acids being based on fats and oils and having a molecular weight of greater than 200 for at least 70% by weight of said carboxylic acid.

10. A process for the production of ionic polymers, said process comprising; reacting polyvalent metal ions and a member selected from the group consisting of an oligomer containing fatty acid residues and at least one reactable carboxyl group per oligomer molecule having a molecular weight above 200 and a mixture of said oligomer with up to 30% by weight, of said mixture of a carboxylic acid having a molecular weight not higher than 200, to form salt bridges, said fatty acid residues of said oligomers being based on fats and oils.

11. The process as claimed in claim 10 wherein said member is applied to a substrate already containing the polyvalent metal ions.

12. The process as claimed in claim 10 wherein said reacting is curing a mixture of said polyvalent metal ions and said member at a temperature of 5° C. to 35° C.

13. The process as claimed in claim 10 wherein a mixture of said polyvalent metal ions and said member are cured while interposed between two substrates to adhere said substrates to one another.

14. The process as claimed in claim 10 wherein a mixture of said polyvalent metal ions and said member are cured as a coating on the surface of a substrate.

15. The process as claimed in claim 10 wherein said polyvalent metal ions and said member are present in an aqueous dispersion.

\* \* \* \* \*